United States Patent
Han et al.

(10) Patent No.: US 12,246,319 B2
(45) Date of Patent: Mar. 11, 2025

(54) ACTIVE DROPLET GENERATING APPARATUS CAPABLE OF CONTROLLING DROPLET SIZE, METHOD OF CONTROLLING DROPLET SIZE USING THE SAME, AND SELF-DIAGNOSIS APPARATUS FOR DIAGNOSING GENERATION OF DROPLET

(71) Applicant: INJE UNIVERSITY INDUSTRY-ACADEMIC COOPERATION FOUNDATION, Gimhae-si (KR)

(72) Inventors: Ki Ho Han, Busan (KR); Jun Hyeong Kim, Gimhae-si (KR)

(73) Assignee: INJE UNIVERSITY INDUSTRY-ACADEMIC COOPERATION FOUNDATION, Gimhae-si (KR)

( * ) Notice: Subject to any disclaimer, the term of this patent is extended or adjusted under 35 U.S.C. 154(b) by 571 days.

(21) Appl. No.: 17/612,822

(22) PCT Filed: Oct. 8, 2021

(86) PCT No.: PCT/KR2021/013847
§ 371 (c)(1),
(2) Date: Nov. 19, 2021

(87) PCT Pub. No.: WO2022/215817
PCT Pub. Date: Oct. 13, 2022

(65) Prior Publication Data
US 2023/0234060 A1 Jul. 27, 2023

(30) Foreign Application Priority Data
Apr. 5, 2021 (KR) .................. 10-2021-0043797

(51) Int. Cl.
*B01L 3/00* (2006.01)
*A61L 27/16* (2006.01)
(Continued)

(52) U.S. Cl.
CPC ........ *B01L 3/502784* (2013.01); *G01N 15/02* (2013.01); *G01N 27/10* (2013.01);
(Continued)

(58) Field of Classification Search
CPC .......... B01L 3/502784; B01L 2200/06; B01L 2300/0645; B01L 2200/0684;
(Continued)

(56) References Cited

U.S. PATENT DOCUMENTS

| | | | |
|---|---|---|---|
| 2011/0266151 A1* | 11/2011 | Jansson | B01L 3/502707 156/219 |
| 2013/0028812 A1* | 1/2013 | Prieto | B01J 13/04 422/502 |
| 2015/0322487 A1* | 11/2015 | Lee | G01N 27/04 324/705 |

FOREIGN PATENT DOCUMENTS

| | | | |
|---|---|---|---|
| KR | 10-1852719 B1 | 4/2018 | |
| KR | 102054610 B1 * | 12/2019 | ........... G01P 1/00 |
| WO | WO-2020132010 A1 * | 6/2020 | ........ B01L 3/502715 |

OTHER PUBLICATIONS

English Machine Translation of WO2020132010A1, obtained from Google Patents on Apr. 18, 2024, pp. 1-44. (Year: 2024).*

* cited by examiner

*Primary Examiner* — Jennifer Wecker
*Assistant Examiner* — Oyeleye Alexander Alabi
(74) *Attorney, Agent, or Firm* — Sughrue Mion, PLLC (57) ABSTRACT

Provided are an active droplet generating apparatus capable of controlling a droplet size, a method of controlling a droplet size using the same, and a self-diagnosis apparatus (Continued)

for diagnosing generation of a droplet, the active droplet generating apparatus including: a disposable microchannel upper plate; a multifunctional lower plate separated from the disposable microchannel upper plate and configured to be permanently used separately from the disposable microchannel upper plate; a functional polymeric film provided on a lower surface of the upper plate; a negative pressure forming means; and a flow velocity control device configured to adjust the droplet size to a desired size by receiving, by feedback, the voltage value measured by the droplet measuring electrode and controlling flow velocities of the oil and the sample, thereby controlling the droplet size in a feedback control manner by quickly and accurately measuring the droplet size using a capacitance impedance technique.

6 Claims, 6 Drawing Sheets

(51) Int. Cl.

| | |
|---|---|
| A61L 27/56 | (2006.01) |
| B01F 23/00 | (2022.01) |
| B01F 23/41 | (2022.01) |
| B01F 101/23 | (2022.01) |
| B01L 7/00 | (2006.01) |
| B01L 9/00 | (2006.01) |
| B23Q 17/24 | (2006.01) |
| C07K 14/705 | (2006.01) |
| C08F 220/56 | (2006.01) |
| C08L 33/26 | (2006.01) |
| C12M 1/34 | (2006.01) |
| C12Q 1/04 | (2006.01) |
| C12Q 1/18 | (2006.01) |
| C12Q 1/6844 | (2018.01) |
| C12Q 1/686 | (2018.01) |
| G01N 1/31 | (2006.01) |
| G01N 15/00 | (2024.01) |
| G01N 15/02 | (2024.01) |
| G01N 21/17 | (2006.01) |
| G01N 21/3577 | (2014.01) |
| G01N 21/359 | (2014.01) |
| G01N 21/39 | (2006.01) |
| G01N 21/45 | (2006.01) |
| G01N 21/64 | (2006.01) |
| G01N 21/77 | (2006.01) |
| G01N 21/78 | (2006.01) |
| G01N 27/10 | (2006.01) |
| G01N 27/414 | (2006.01) |
| G01N 30/12 | (2006.01) |
| G01N 30/68 | (2006.01) |
| G01N 30/70 | (2006.01) |
| G01N 30/72 | (2006.01) |
| G01N 30/88 | (2006.01) |
| G01N 33/00 | (2006.01) |
| G01N 33/18 | (2006.01) |
| G01N 33/50 | (2006.01) |
| G01N 33/53 | (2006.01) |
| G01N 33/543 | (2006.01) |
| G01N 33/68 | (2006.01) |
| G01N 33/74 | (2006.01) |
| G01N 35/00 | (2006.01) |
| G01N 35/10 | (2006.01) |
| G06T 7/00 | (2017.01) |
| G06T 7/90 | (2017.01) |
| H10K 10/46 | (2023.01) |
| H10K 85/00 | (2023.01) |
| H10K 85/20 | (2023.01) |

(52) U.S. Cl.
CPC ... *B01L 2200/06* (2013.01); *B01L 2300/0645* (2013.01); *G01N 2015/0003* (2013.01)

(58) Field of Classification Search
CPC ....... B01L 2200/143; B01L 2400/0487; G01N 15/02; G01N 27/10; G01N 2015/0003; G01N 15/1023; G01N 15/1031; G01N 2015/003; G01N 35/1016; G01N 2015/1024; G01N 2015/1027; G01N 2015/1029; G01N 2035/1018; G01N 2035/103; G01N 2035/1039; G01N 2035/1041; G01N 1/00; G01N 1/28; G01N 2001/002; G01N 2015/1406
See application file for complete search history.

ACTIVE DROPLET GENERATING APPARATUS CAPABLE OF CONTROLLING DROPLET SIZE, METHOD OF CONTROLLING DROPLET SIZE USING THE SAME, AND SELF-DIAGNOSIS APPARATUS FOR DIAGNOSING GENERATION OF DROPLET

CROSS REFERENCE TO RELATED APPLICATIONS

This application is a National Stage of International Application No. PCT/KR2021/013847, filed Oct. 8, 2021, claiming priority to Korean Patent Application No. 10-2021-0043797, filed Apr. 5, 2021, the entire disclosures of which are incorporated herein by reference.

TECHNICAL FIELD

The present invention relates to an active droplet generating apparatus capable of controlling a droplet size, a method of controlling a droplet size using the same, and a self-diagnosis apparatus for diagnosing generation of a droplet, and more particularly, to an active droplet generating apparatus, a method of controlling a droplet size, and a self-diagnosis apparatus, which are capable of adjusting a droplet size to a desired size, changing the number of droplets, and performing self-diagnosis on the generation of the droplet.

BACKGROUND ART

In comparison with a PCR method (the first generation) in the related art that checks the presence of a target gene using a polymerase chain reaction (PCR) and agarose gel electrophoresis and a real-time PCR method (the second generation) capable of checking, in real time, amplification of a target gene using a fluorescent material, a digital PCR method is evaluated as a next-generation PCR detection method because the digital PCR may detect an absolute quantity of target genes in real time without a reference material and have very high sensitivity.

Only five companies in the world sell commercially available apparatuses for implementing the digital PCR, and the methods of implementing the digital PCR in these companies are broadly classified into a fine partition wall type using a chip and an open-array flat plate and a droplet type for an emulsion PCR.

However, the problem of the currently commercially available digital PCR technology is that the application of the digital PCR technology to general laboratories in universities and public research facilities is restrictive because of high-priced apparatuses (2 to 5 billion Korean won) and chip consumption (0.03 to 1 million Korean won), and it is impossible to monitor the number of droplets produced by a passive droplet generating method.

In the case of the passive droplet generating method, there is a problem in that accuracy of an experimental result deteriorates because of the irregularity of droplet sizes due to air bubbles in a channel or a change in environments, and self-diagnosis capable of determining whether an operation is abnormal during the passive droplet generation cannot be performed.

In addition, when a high-priced flow velocity sensor is repeatedly used for active droplet generation, there is a problem in that contamination occurs between biosamples. These problems also occur in most of the high-performance lab-on-a-chip chips as well as the microfluid-based digital PCR technology. That is, there may occur an error in an analysis result due to contamination between the biosamples when the lab-on-a-chip chip is reused. Therefore, the lab-on-a-chip chip needs to necessarily be developed and used as a disposable product.

However, in many cases, various lab-on-a-chip chips are provided, and complicated functions are required to implement precise performance. For this reason, a manufacturing process is complicated, which causes an increase in costs required to manufacture the chips. This is a large obstacle that hinders commercial availability of the lab-on-a-chip chip that needs to be essentially used as a disposable product.

In addition, fine air droplets, which may be generated in the microfluid channel, hinder the precise control and flow of the fluid, and degrade reproducibility of the lab-on-a-chip chip. This is one of the main reasons that make it difficult to implement automation and commercial availability of the lab-on-a-chip chip.

Development of technologies are being conducted worldwide to basically prevent the contamination between the biosamples and reduce economic burden on the use of the microfluid chip by solve the problem of the passive droplet generating chip (lab-on-a-chip chip) in the related art. However, the technology is still in an initial step level. Therefore, recently, the present applicant has manufactured a disposable microchannel upper plate and a permanently available multifunctional lower plate, and developed a technology related to a disposable film chip that may be used by being coupled (or separated) by a vacuum (Korean Patent No. 10-1852719, U.S. patent application Ser. No. 16/603,013). Therefore, the present applicant proposes the present invention to simply manufacture a disposable digital PCR active droplet generating apparatus at a low cost.

DISCLOSURE

Technical Problem

The present invention has been made in an effort to solve the problems in the related art, and an object of the present invention is to provide a disposable digital PCR active droplet generating apparatus, in which a disposable microchannel upper plate and a permanently available multifunctional lower plate may be coupled or separated by vacuum, a droplet size may be quickly and accurately measured by a capacitance impedance technique, and the droplet size may be controlled in a feedback control manner.

Another object of the present invention is to provide a low-priced high-performance disposable active droplet generating apparatus implemented at a low cost by using a disposable film chip technology without using a high-priced apparatus in the related art.

Still another object of the present invention is to provide a disposable droplet generating apparatus capable of generating uniform droplets with various sizes by developing a capacitance impedance measurement technology capable of accurately and quickly measuring a droplet size using a disposable film chip manufacturing technology and a permittivity difference between a biosample and oil and by controlling a flow velocity of the oil depending on the capacitance impedance measurement technology.

Yet another object of the present invention is to provide a method of controlling a droplet size, which is capable of controlling a droplet size in a feedback control manner by measuring sizes and the number of droplets in real time using a capacitance impedance measurement technology.

Still yet another object of the present invention is to provide a real-time self-diagnosis apparatus capable of uniformly controlling droplets with various sizes in a proportional-integral-derivative (PID) feedback control manner, together with a pneumatic flow velocity control system, using an integrated flow velocity sensing electrode capable of measuring, in real time, a flow velocity of a biosample and oil used to generate the droplet, and capable of performing self-diagnosis on the generation of the droplet by optimizing a digital PCR genetic analysis speed and sensitivity by controlling the number of droplets to be generated.

Technical Solution

One aspect of the present invention provides an active droplet generating apparatus capable of controlling a droplet size, the active droplet generating apparatus including: a disposable microchannel upper plate having a sample inlet port into which a sample is introduced, an oil inlet port into which oil is introduced, a microchannel through which the fluids introduced through the inlet ports pass, and a discharge port from which the fluids have passed through the microchannel are discharged; a multifunctional lower plate separated from the disposable microchannel upper plate and configured to be permanently used separately from the disposable microchannel upper plate; a functional polymeric film provided on a lower surface of the upper plate and configured to remove, in real time, air bubbles in the microchannel while separating the upper plate and the lower plate; a droplet measuring electrode patterned on an upper surface of the lower plate and configured to measure a droplet size depending on a voltage value of the fluid passing through the microchannel; a negative pressure forming means configured to apply a negative pressure between the upper plate and the lower plate so that the upper plate and the lower plate are coupled or separated by vacuum; and a flow velocity control device configured to adjust the droplet size to a desired size by receiving, by feedback, the voltage value measured by the droplet measuring electrode and controlling flow velocities of the oil and the sample.

Meanwhile, flow velocity sensing electrodes for detecting flow velocities of the fluids flowing in the microchannel may be integrally formed on the multifunctional lower plate.

The flow velocity sensing electrodes may be respectively and separately formed in the sample inlet port, the oil inlet port, the second oil inlet port, and the oil discharge port.

In addition, the flow velocity control device may include: a microcontroller configured to receive the voltage value measured by the droplet measuring electrode by feedback and control the flow velocities of the oil and the sample; and a pneumatic regulator configured to adjust the droplet size to the desired size by adjusting the flow velocities of the oil and the sample supplied to the microchannel under the control of the microcontroller.

In this case, the pneumatic regulator may be provided in plural, the plurality of pneumatic regulators may be respectively connected to the sample inlet port and the oil inlet port, and a pneumatic pump and a valve may be connected to the pneumatic regulator to adjust an air pressure of the pneumatic regulator.

The disposable microchannel upper plate may further include a second oil inlet port, and a droplet discharge port and the oil discharge port may be separately formed to discharge the fluids having passed through the microchannel while dividing the fluids into the droplet and the oil.

The microchannel may have a '+'-shaped droplet generating structure configured to generate the droplet and provided at a point at which the oil and the sample meet together, and the oil may be introduced through the second oil inlet port between the '+'-shaped droplet generating structure and the droplet measuring electrode to increase an interval between the droplets.

Another aspect of the present invention provides a method of controlling a droplet size using an active droplet generating apparatus, the method including: (a) introducing a sample and oil into a sample inlet port and an oil inlet port to make a droplet; (b) measuring, by a droplet measuring electrode, a voltage value of the droplet which is made first when the fluids introduced through the inlet ports flow in a microchannel; (c) transmitting the measured voltage value of the droplet to a microcontroller by feedback; (d) comparing the voltage value of the droplet received by the microcontroller by feedback with a voltage value of a droplet with a desired size; (e) adjusting, by the microcontroller, the droplet size by adjusting a velocity of the fluid flowing in the microchannel when the voltage value of the droplet received by feedback is not the desired value; (f) measuring, in real time, by the droplet measuring electrode, a voltage value of the droplet with the adjusted size; (g) transmitting the measured voltage value of the droplet to the microcontroller by feedback and adjusting, by the microcontroller, the droplet size by adjusting the velocity of the fluid flowing in the microchannel until a desired droplet size is made depending on the voltage value of the droplet received by feedback; and (h) maintaining the sample when the desired droplet size is made until a desired number of droplets are made.

In steps (e) and (g), the size of the droplet may be adjusted to a desired size using a pneumatic regulator configured to adjust the flow velocities of the oil and the sample supplied to the microchannel under the control of the microcontroller.

In steps (e) and (g), the pneumatic regulator may be provided in plural, the plurality of pneumatic regulators may be respectively connected to the sample inlet port and the oil inlet port, and a pneumatic pump and a valve may be connected to the pneumatic regulator to adjust an air pressure of the pneumatic regulator.

Still another aspect of the present invention provides a self-diagnosis apparatus for diagnosing generation of a droplet, the self-diagnosis apparatus including: a disposable microchannel upper plate having a sample inlet port into which a sample is introduced, an oil inlet port into which oil is introduced, a microchannel through which the fluids introduced through the inlet ports pass, and a discharge port from which the fluids have passed through the microchannel are discharged; a multifunctional lower plate separated from the disposable microchannel upper plate and configured to be permanently used separately from the disposable microchannel upper plate; a functional polymeric film provided on a lower surface of the upper plate and configured to remove, in real time, air bubbles in the microchannel while separating the upper plate and the lower plate; a droplet measuring electrode patterned on an upper surface of the lower plate and configured to measure a droplet size depending on a voltage value of the fluid passing through the microchannel; a plurality of flow velocity sensing electrodes integrated formed on an upper surface of the lower plate and configured to measure, in real time, flow velocities of the sample and the oil flowing in the microchannel; a negative pressure forming means configured to apply a negative pressure between the upper plate and the lower plate so that the upper plate and the lower plate are coupled or separated by vacuum; and a flow velocity control device configured to adjust the droplet size to a desired size by receiving, by feedback, the voltage value measured by the droplet measuring electrode and controlling flow velocities of the oil and the sample, in which diagnosis is performed in real time to check whether a droplet generating apparatus operates normally or abnormally by measuring flow velocities in all the inlet port and the discharge port using the flow velocity sensing electrode.

In the present invention, the disposable microchannel upper plate may further include a second oil inlet port, a droplet discharge port and an oil discharge port may be separately formed to discharge the fluids having passed through the microchannel while dividing the fluids into the droplet and the oil, and the flow velocity sensing electrodes may be respectively and separately formed in the sample inlet port, the oil inlet port, the second oil inlet port, the droplet discharge port, and the oil discharge port, such that self-diagnosis is enabled by detecting and controlling the flow velocities of all the inputs and outputs.

Advantageous Effects

According to the present invention described above, the disposable microchannel upper plate and the permanently available multifunctional lower plate may be coupled or separated by vacuum, the droplet size may be quickly and accurately measured by the capacitance impedance technique, and the droplet size may be controlled in a feedback control manner.

In addition, it is possible to provide the low-priced high-performance disposable active droplet generating apparatus implemented at a low cost by using the disposable film chip technology without using a high-priced apparatus in the related art.

Further, it is possible to uniformly control the droplets with various sizes in the proportional-integral-derivative (PID) feedback control manner, together with the pneumatic flow velocity control system, using the plurality of integrated flow velocity sensing electrodes disposed on the multifunctional low plate and capable of measuring, in real time, a flow velocity of the biosample and the oil used to generate the droplet, and it is possible to optimize the digital PCR genetic analysis speed and the sensitivity by controlling the number of droplets to be generated.

In addition, it is possible to measure the droplet size and the number of generated droplets in real time using the capacitance impedance measurement technology. Therefore, it is possible to determine, before the PCR, whether the droplet generating process is abnormal, and determine in advance reliability of the digital PCR genetic test before the amplification of genes. Therefore, the user may recognize in advance an error of the genetic analysis of the digital PCR, which minimizes a loss of time and money.

In addition, both the input and output flow velocities of the biosample and the oil may be controlled and measured using the integrated flow velocity detecting technology, which makes it possible to perform self-diagnosis on abnormality of the operation of the real-time active droplet generating chip.

Furthermore, it is expected that there will be an explosive increase in global market sizes of digital biotechnologies during a post-corona period because the digital biotechnology has significantly high economic values. Therefore, when the low-priced high-performance digital PCR technology is smoothly developed by means of the present invention, this development is expected to contribute to the development of the nation's economy and the development of nano technology-based cutting-edge medical technologies.

MODES OF THE INVENTION

Figure 1:
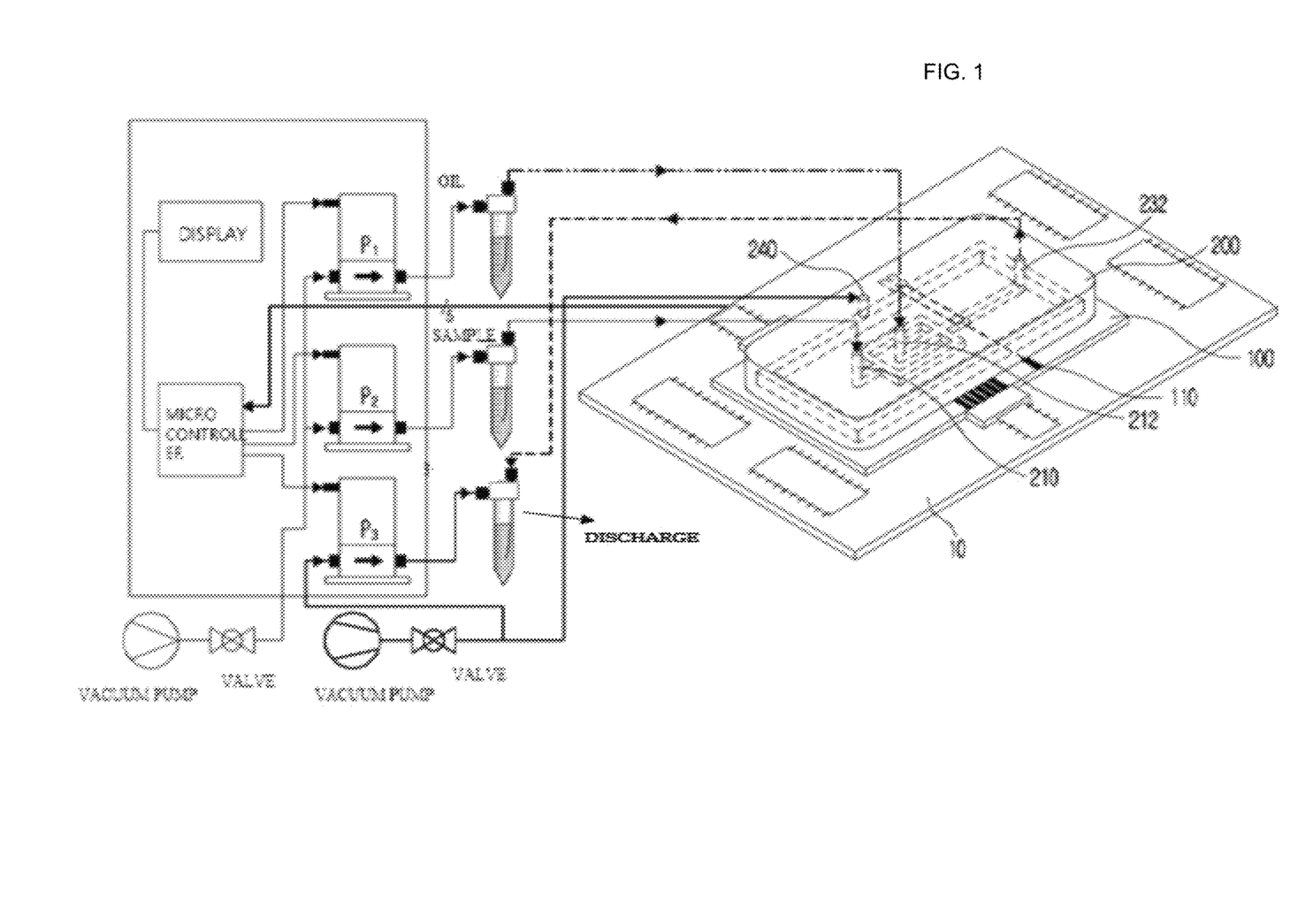
FIG. 1 is an overall configuration view illustrating an embodiment of an active droplet generating apparatus according to the present invention.
Figure 2:
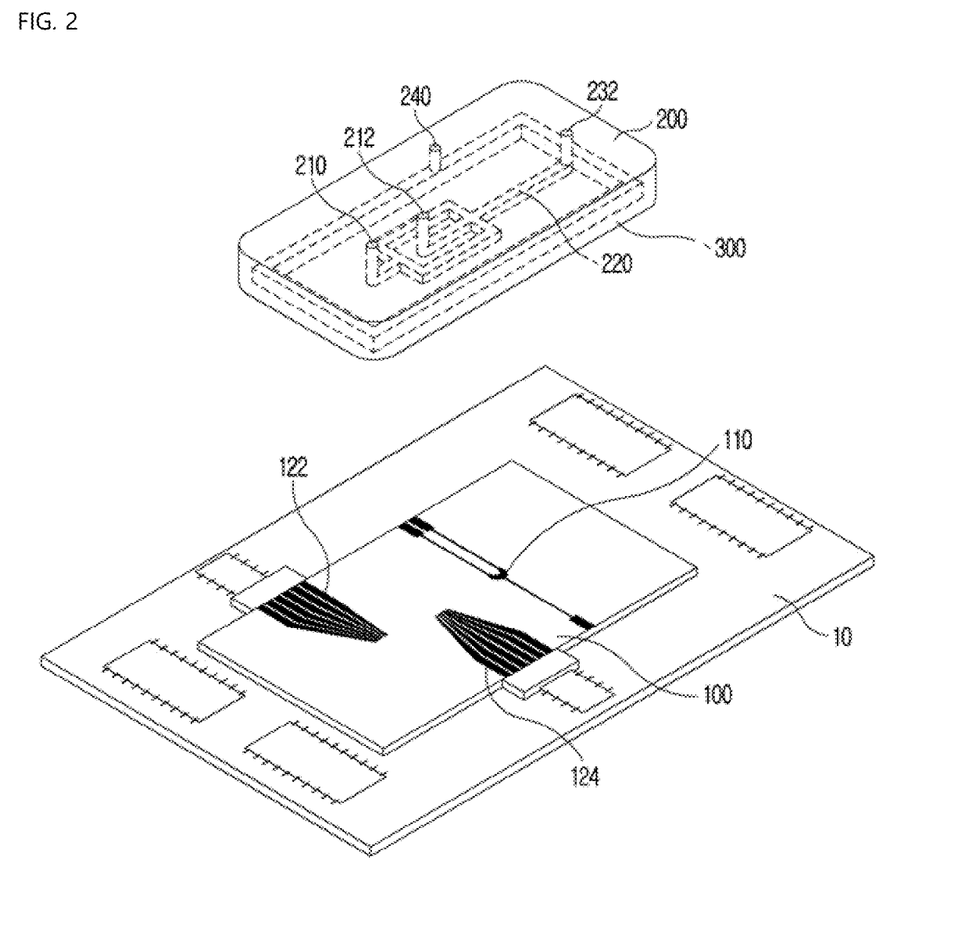
FIG. 2 is an exploded perspective view illustrating an embodiment of the droplet generating chip according to the present invention.
Figure 3:
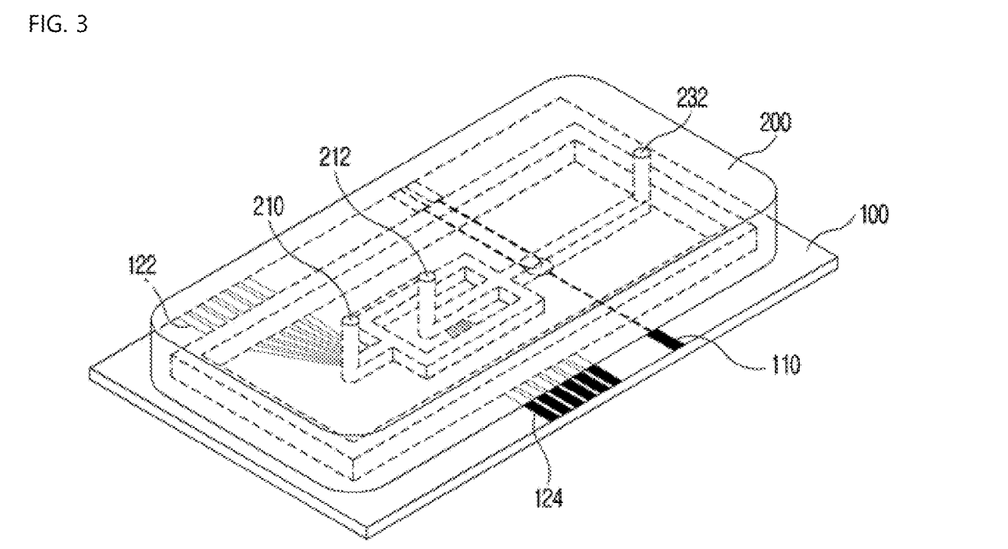
FIG. 3 is a coupled perspective view of the droplet generating chip illustrated in FIG. 2.

FIG. 1 is an overall configuration view illustrating an embodiment of an active droplet generating apparatus according to the present invention, FIG. 2 is an exploded perspective view illustrating an embodiment of the droplet generating chip according to the present invention, and FIG. 3 is a coupled perspective view of the droplet generating chip illustrated in FIG. 2.

As illustrated in FIGS. 1 to 2, the active droplet generating apparatus according to the present invention broadly includes a disposable microchannel upper plate 200, a multifunctional lower plate 100, a functional polymeric film 300, a droplet measuring electrode 110, a negative pressure forming means 240, and a flow velocity control device.

The disposable microchannel upper plate 200 and the multifunctional lower plate 100 according to the present invention are separated, and the functional polymeric film 300 is attached to a lower surface of the disposable microchannel upper plate 200 to prevent a fluid flowing in a microchannel from coming into direct contact with the electrode, such that the multifunctional lower plate 100 integrated with the electrode may be used permanently.

In the disposable microchannel upper plate 200, a sample inlet port 210 into which a sample is introduced is formed, an oil inlet port 212 into which oil is introduced is formed, a microchannel 220 through which the fluids introduced through the inlet ports pass, and a discharge port from which the fluids passing through the microchannel 220 are discharged.

Figure 4:
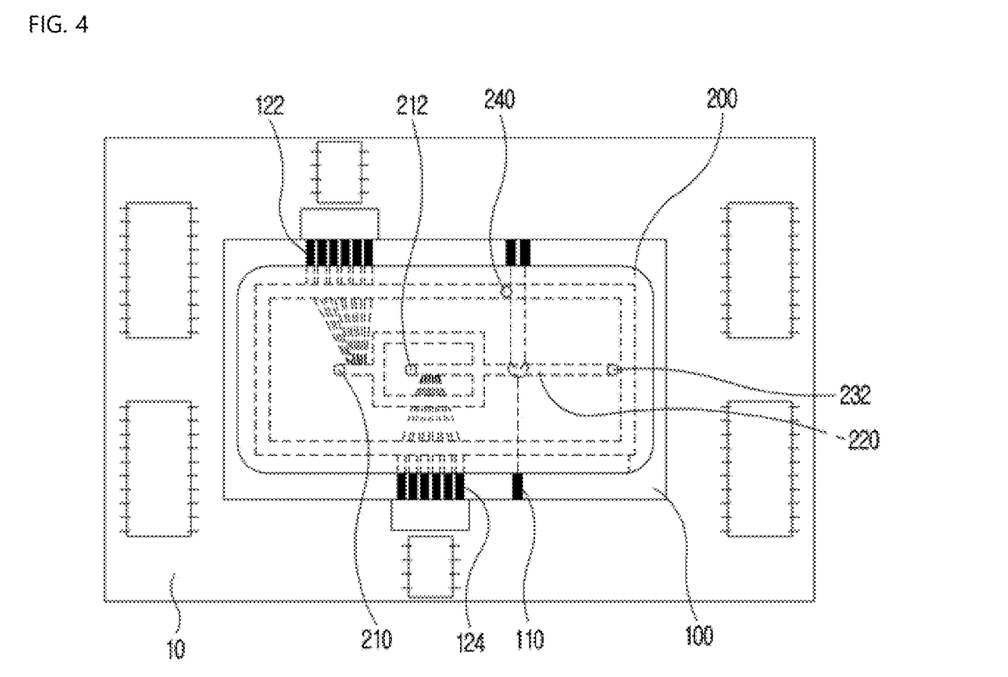
FIG. 4 is a top plan view of the droplet generating chip illustrated in FIG. 3.

As illustrated in FIG. 4, in the microchannel 220 according to the present invention, the sample introduced from the sample inlet port 210 and the oil introduced from the oil inlet port 212 meet together in directions perpendicular to each other at a junction point.

That is, the microchannel 220 has a '+' shaped droplet generating structure configured to generate a droplet and formed at the point at which the oil and the sample meet together. At the junction point, the direction in which the sample flows is perpendicular to the direction in which the oil is merged, such that the droplet may be formed.

Meanwhile, the functional polymeric film 300 is attached to the lower surface of the upper plate 200 so that the electrode may measure a voltage value in the state in which the sample flowing through the microchannel 220 is not in direct contact with the electrode of the lower plate 100.

In this case, the film 300 needs to have a size including the entire microchannel 220 and may be as thin as about 4 µm, for example, so that an electric field, a magnetic force, or the like may be appropriately transmitted to the sample flowing in the microchannel 220.

In addition, the functional polymeric film 300 serves to capture foreign substances and air bubbles in the channel and remove the air bubbles in the microchannel in real time.

Meanwhile, the multifunctional lower plate 100 is separated from the disposable microchannel upper plate 200 and separately used permanently. A plurality of flow velocity sensing electrodes 122 and 124 and the droplet measuring electrode 110 for measuring the droplet sizes and the number of droplets are integrally formed on the permanently available multifunctional lower plate 100. A board 10 having a drive circuit is provided on a lower surface of the multifunctional lower plate 100.

The droplet measuring electrode 110 is patterned on an upper surface of the lower plate 100 and measures a length of the droplet depending on a voltage value measured depending on a capacitance value of the fluid passing through the microchannel. The droplet measuring electrode 110 is positioned and disposed below the point at which the droplet is formed, such that the droplet measuring electrode may measure the droplet length of the sample passing through the channel.

In the present invention, the voltage value measured by the electrode increases as the length of the droplet increases when the droplet passes through the droplet measuring electrode 110. Therefore, the length of the droplet may be measured on the principle that the length of the droplet is measured depending on the voltage value measured by the droplet measuring electrode 110.

That is, an electric field is formed on the channel at normal times. When the oil flows, the permittivity is lowered, such that no current is measured. When the sample flows, the current flows, and the droplet measuring electrode 110 detects the flow of current, thereby measuring the length of the droplet.

Figure 5:
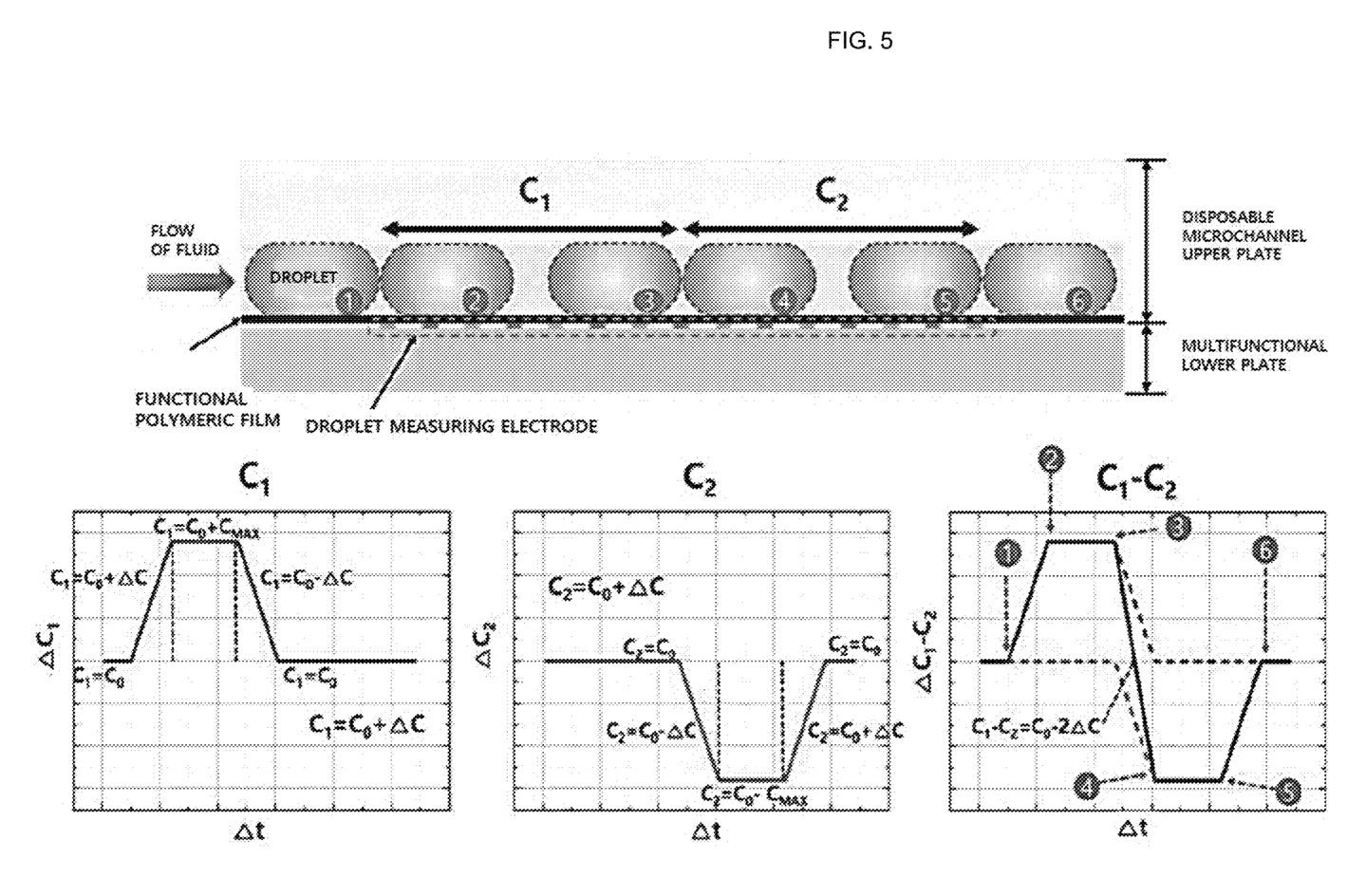
FIG. 5 is a conceptual view illustrating a capacitance impedance-based droplet size measurement technology and illustrating an output of a detection signal based on a droplet position in the present invention.

FIG. 5 is a conceptual view illustrating a capacitance impedance-based droplet size measurement technology and illustrating an output of a detection signal based on a droplet position in the present invention. The picture and the graph in FIG. 5 illustrate the output of the detection signal that varies while the fluid passes over the capacitive electrode and illustrate moment 1 when the droplet enters region C1, moment 2 when the droplet is completely introduced into region C1, moment 3 when the droplet departs from region C1 and enters region C2, moment 4 when the droplet is completely introduced into region C2, moment 5 when the droplet begins to depart from region C2, and moment 6 when the droplet completely departs from region.

Meanwhile, the flow velocity sensing electrodes for detecting flow velocities of the fluids flowing in the microchannel are integrally formed on the multifunctional lower plate 100.

The flow velocity sensing electrodes 122 and 124 separately measure the flow velocities of the fluids flowing through the sample inlet port and the oil inlet port.

Meanwhile, the present invention includes the negative pressure forming means for applying a negative pressure between the upper plate and the lower plate so that the upper plate 200 and the lower plate 100 may be coupled or separated by vacuum. The negative pressure forming means includes a negative pressure applying hole 240 which communicates with a portion where the lower plate 100 and the upper plate 200 adjoin. The negative pressure applying hole 240 sucks the lower plate 100 and the upper plate 200 as the negative pressure is applied.

The negative pressure applying hole 240 may be connected to an external device and apply the negative pressure. In the present invention, the negative pressure applying hole 240 is coupled to a vacuum pump and a valve, which will be described below, and forms the negative pressure.

In addition, the present invention includes the flow velocity control device that receives the voltage value measured by the droplet measuring electrode 110 by feedback and adjusts the droplet size to a desired size by controlling flow velocities of the oil and sample.

As illustrated in FIG. 1, the flow velocity control device includes a microcontroller configured to receive the voltage value measured by the droplet measuring electrode 110 by feedback and control the flow velocities of the oil and sample, and a pneumatic regulator configured to adjust the droplet size to the desired size by adjusting the flow velocities of the oil and sample supplied to the microchannel 220 under the control of the microcontroller.

In this case, the pneumatic regulator is provided in plural, and the plurality of pneumatic regulators is respectively connected to the sample inlet port 210 and the oil inlet ports 212 and 214. The respective pneumatic regulators adjust air pressures P1 and P2 and adjust the flow velocities of the oil and sample to be supplied to the sample inlet port 210 and the oil inlet ports 212 and 214.

A pneumatic pump and a valve may be connected to the pneumatic regulators so that the pneumatic regulators adjust the air pressures P1 and P2.

In addition, the microcontroller is connected to and controls the pneumatic regulators for discharging the oil, which flows through the microchannel 220 and then is discharged through the oil discharge port 232, and the pneumatic regulator may be connected to a vacuum pump and a valve and discharge the oil.

Figure 8:
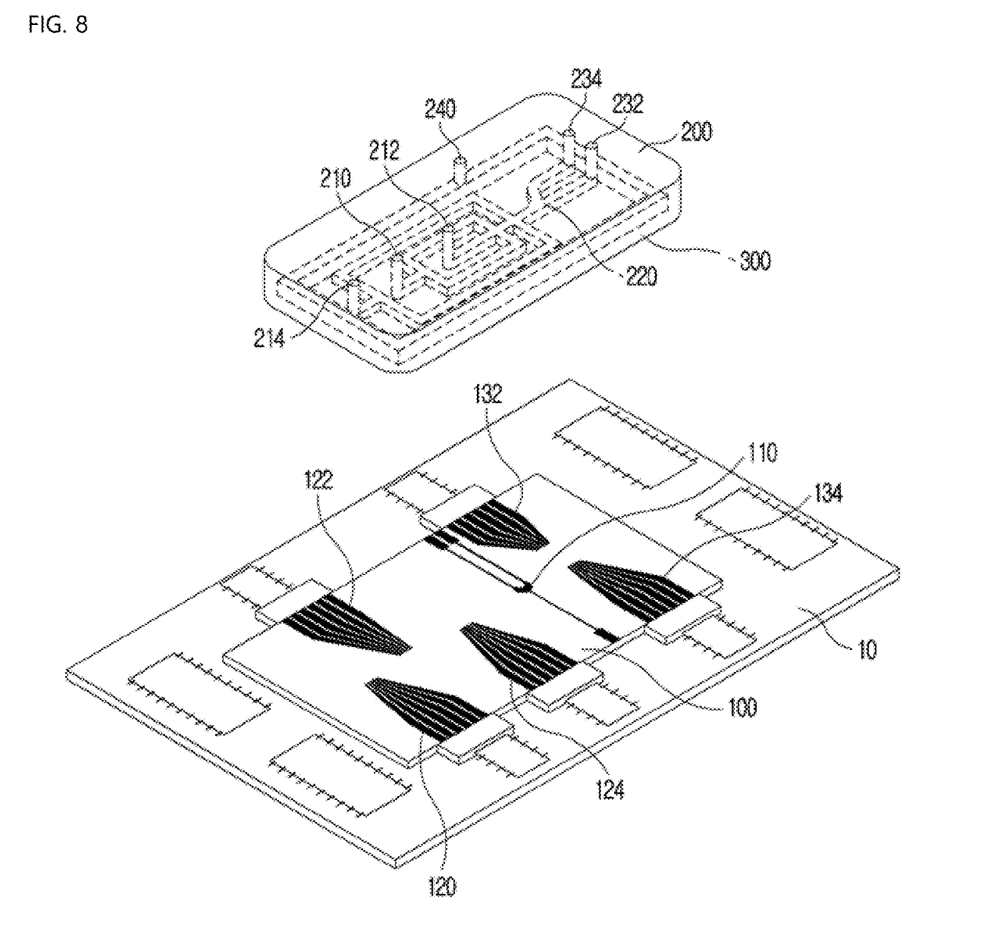
FIG. 8 is an exploded perspective view illustrating another embodiment of the droplet generating chip according to the present invention.

FIG. 8 is an exploded perspective view illustrating another embodiment of the droplet generating chip according to the present invention. In another embodiment of the present invention, two oil inlet ports into which the oil is introduced are formed. The second oil inlet port 214 is provided separately from the oil inlet port 212. A droplet discharge port 234 and the oil discharge port 232 are separately formed to discharge the fluids having passed through the microchannel 220 while dividing the fluids into the droplet and the oil.

In another embodiment of the present invention described above, the microchannel 220 is formed such that the sample introduced from the sample inlet port 210 and the oil introduced from the oil inlet port 212 and the second oil inlet port 214 meet together in directions perpendicular to one another at a junction point.

That is, the microchannel 220 has the '+' shaped droplet generating structure configured to generate the droplet and formed at the point at which the oil and the sample meet together. At the junction point, the direction in which the sample flows is perpendicular to the direction in which the oil is merged, such that the droplet may be formed.

In the present invention, to increase an interval between the droplets, the oil is introduced and merged through the second oil inlet port 214 between the '+'-shaped droplet generating structure and the droplet measuring electrode 110.

In this case, a plurality of flow velocity sensing electrodes 120, 122, 124, 132, and 134 and the droplet measuring electrode 110 for measuring the droplet size and the number of droplets are integrally formed on the multifunctional lower plate 100. The flow velocity sensing electrodes 120, 122, 124, 132, and 134 respectively and separately measure the flow velocities of the fluids flowing in the sample inlet port, the oil inlet port, the second oil inlet port, the droplet discharge port, and the oil discharge port.

A method of controlling the droplet size using the active droplet generating apparatus according to the present invention configured as described above will be described below.

First, to form a droplet, the sample and the oil are respectively introduced into the sample inlet port 210 and the oil inlet port 212.

Thereafter, the droplet measuring electrode 110 is used to measure a voltage value of the droplet made first when the fluid introduced through the inlet ports flows in the microchannel 220.

The measured voltage value of the droplet is transmitted to the microcontroller by feedback, and the microcontroller compares the voltage value of the droplet received by feedback with a voltage value of a droplet with a desired size.

When the voltage value of the droplet received by feedback is not the desired value, the microcontroller adjusts a velocity of the fluid flowing in the microchannel using the pneumatic regulator, thereby adjusting the droplet size.

Thereafter, the droplet measuring electrode 110 is used to measure, in real time, the voltage value of the droplet with the adjusted size.

The measured voltage value of the droplet is transmitted to the microcontroller by feedback, and the microcontroller adjusts the velocity of the fluid flowing in the microchannel to adjust the droplet size until a desired droplet size is made depending on the voltage value of the droplet received by feedback.

When the desired droplet size is made, the desired droplet size is maintained until a desired number of droplets are made from the sample, such that the desired number of droplets with the desired size are obtained.

The droplet size may be controlled by the aforementioned method, and the desired number of droplets may be obtained.

For example, if 20 thousand droplets need to be made from the sample of 20 ul, the droplet needs to have a volume of 1 nl.

To make the droplets, the voltage value of the droplet, which is made first, is measured. The voltage value varies depending on the volume of the droplet, and the voltage values to be measured are determined for the respective droplet sizes.

The measured voltage value is transmitted to the microcontroller by feedback.

If the voltage is not the voltage corresponding to 1 nl, the pneumatic regulator is used to adjust the pneumatic pressure, and the flow of the oil or sample is changed, such that the droplet size is adjusted to a desired size.

Therefore, if the voltage corresponding to 1 nl is measured, this state is maintained until 20 thousand droplets are made from the sample of 20 ul, such that 20 thousand droplets are obtained.

This may be used to perform analysis using a ddPCR reader.

When comparing the genetic analysis using 20 thousand droplets and the genetic analysis using 100 thousand droplets, the sensitivity of the data from the genetic analysis using 100 thousand droplets is better than the sensitivity of the data from the genetic analysis using 20 thousand droplets. Therefore, the number of droplets needs to be adjusted.

Figure 7:
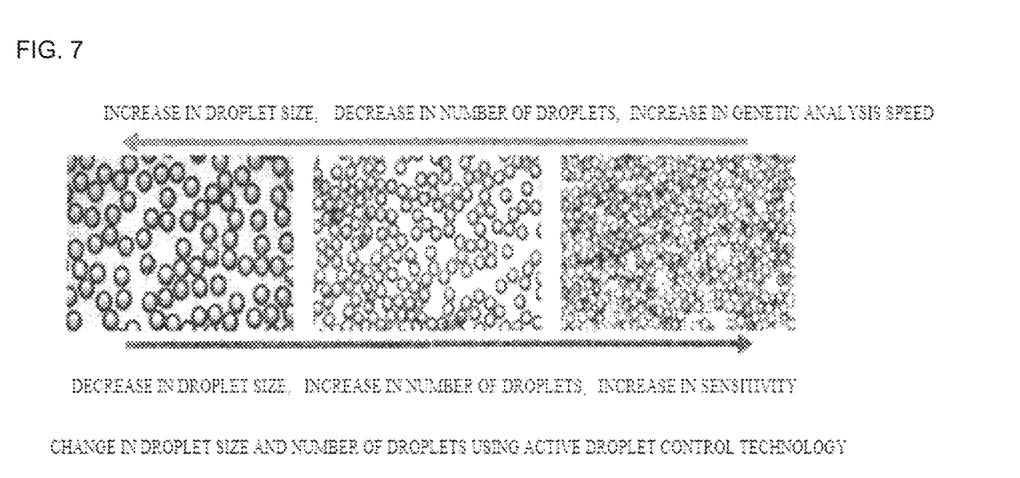
FIG. 7 is a view illustrating a relationship between sensitivity and a genetic analysis speed based on a change in number of droplets in the present invention.

FIG. 7 is a view illustrating a relationship between a genetic analysis speed and sensitivity based on a change in number of droplets in the present invention. When the droplets are made from the same amount of sample, the number of droplets increases as the droplet size decreases, and the sensitivity increases as the number of droplets increases.

In addition, the number of droplets decreases as the droplet size increases, and the sensitivity decreases and the genetic analysis speed increases as the number of droplets decreases. Therefore, the use of the present invention may uniformly control the droplets with various sizes and optimize the digital PCR genetic analysis speed and the sensitivity by controlling the number of droplets to be generated.

Meanwhile, the active droplet generating apparatus according to the present invention may perform self-diagnosis on the generation of the droplets.

That is, according to the present invention, the flow velocity sensing electrodes 120, 122, 124, 132, and 134 are configured to respectively and separately measure the flow velocities of the fluids flowing in the sample inlet port, the oil inlet port, the second oil inlet port, the droplet discharge port, and the oil discharge port. Therefore, it is possible to check in real time whether the droplet generating apparatus normally or abnormally operates by measuring the flow velocities in all the inlet ports and the discharge ports using the flow velocity sensing electrode.

Figure 6:
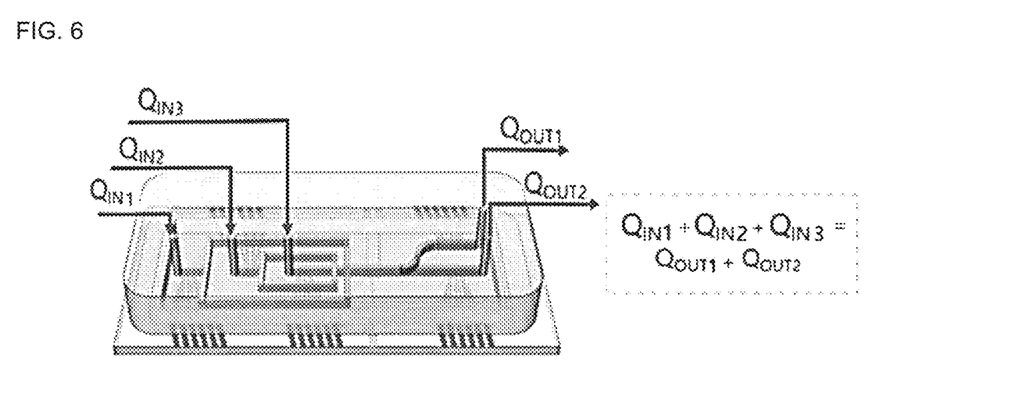
FIG. 6 is a conceptual view illustrating digital PCR active droplet generating chip self-diagnosis according to the present invention.

FIG. 6 is a conceptual view illustrating digital PCR active droplet generating chip self-diagnosis in the present invention. The flow velocity sensing electrodes 120, 122, 124, 132, and 134, which are respectively installed in the sample inlet port, the oil inlet port, the second oil inlet port, the droplet discharge port, and the oil discharge port, may measure the amount of introduced fluids and the amount of discharged fluids.

In this case, it can be seen that the droplet generating apparatus normally operates when the amount of fluids (Qin1+Qin2+Qin3) introduced into the microchannel is equal to the amount of discharged fluids (Qout1+Qout2), and the droplet generating apparatus abnormally operates when the amount of fluids (Qin1+Qin2+Qin3) introduced into the microchannel is different from the amount of discharged fluids (Qout1+Qout2).

Therefore, the self-diagnosis, which may determine in real time whether there is abnormality, may be performed by measuring the amount of introduced fluids and the amount of discharged fluids by the flow velocity sensing electrodes 122 and 124. As a result, the self-diagnosis function may uniformly and actively control the droplet size.

It is apparent that the scope of the present invention is not limited to the exemplary embodiment described above and defined by the appended claims, and the exemplary embodiment may be variously modified and altered by those skilled in the art without departing from the scope defined by the appended claims.

The invention claimed is:

1. An active droplet generating apparatus capable of controlling a droplet size, the active droplet generating apparatus comprising:

a disposable microchannel upper plate having a sample inlet port into which a sample is introduced, an oil inlet port into which oil is introduced, a microchannel through which the sample and the oil introduced through the sample inlet port and the oil inlet port pass, and a discharge port from which the sample and the oil have passed through the microchannel are discharged;

a multifunctional lower plate separated from the disposable microchannel upper plate and configured to be permanently used separately from the disposable microchannel upper plate;

a functional polymeric film provided on a lower surface of the disposable microchannel upper plate and configured to remove, in real time, air bubbles in the microchannel while separating the disposable microchannel upper plate and the multifunctional lower plate;

a droplet measuring electrode patterned on an upper surface of the multifunctional lower plate and configured to measure a droplet size depending on a voltage value of the fluid passing through the microchannel;

a negative pressure forming means configured to apply a negative pressure between the disposable microchannel upper plate and the multifunctional lower plate so that the disposable microchannel upper plate and the multifunctional lower plate are coupled or separated by vacuum; and a flow velocity control device configured to adjust the droplet size to a desired size by receiving, by feedback, the voltage value measured by the droplet measuring electrode and controlling flow velocities of the oil and the sample, wherein the flow velocity control device comprises:

a microcontroller configured to receive the voltage value measured by the droplet measuring electrode by feedback and control the flow velocities of the oil and the sample; and a pneumatic regulator configured to adjust the droplet size to the desired size by adjusting the flow velocities of the oil and the sample supplied to the microchannel under the control of the microcontroller.

2. The active droplet generating apparatus of claim 1, wherein the pneumatic regulator is provided in plural, the plurality of pneumatic regulators is respectively connected to the sample inlet port and the oil inlet port, and a pneumatic pump and a valve are connected to the pneumatic regulator to adjust an air pressure of the pneumatic regulator.

3. An active droplet generating apparatus capable of controlling a droplet size the active droplet generating apparatus comprising:

a disposable microchannel upper plate having a sample inlet port into which a sample is introduced, an oil inlet port into which oil is introduced, a microchannel through which the sample and the oil introduced through the sample inlet port and the oil inlet port pass, and a discharge port from which the sample and the oil have passed through the microchannel are discharged;

a multifunctional lower plate sep rated rom the disposable microchannel upper plate and configured to be permanently used separately from the disposable microchannel upper plate;

a functional polymeric film provided on a lower surface of the disposable microchannel upper plate and configured to remove, in real time, air bubbles in the microchannel while separating the disposable microchannel upper plate and the multifunctional lower plate;

a droplet measuring electrode patterned on an upper surface of the multifunctional lower plate and configured to measure a droplet size depending on a voltage value of the fluid passing through the microchannel;

a negative pressure forming means configured to apply a negative pressure between the disposable microchannel upper plate and the multifunctional lower plate so that the disposable microchannel upper plate and the multifunctional lower plate are coupled or separated by vacuum; and a flow velocity control device configured to adjust the droplet size to a desired size by receiving, by feedback, the voltage value measured by the droplet measuring electrode and controlling flow velocities of the oil and the sample, wherein flow velocity sensing electrodes for detecting flow velocities of the fluids flowing in the microchannel are integrally formed on the multifunctional lower plate.

4. The active droplet generating apparatus of claim 3, wherein the flow velocity sensing electrodes are respectively and separately formed in the sample inlet port and the oil inlet port.

5. An active droplet generating apparatus capable of controlling a droplet size, the active droplet generating apparatus comprising:

a disposable microchannel upper plate having a sample inlet port into which a sample is introduced, an oil inlet port into which oil is introduced, a microchannel through which the sample and the oil introduced through the sample inlet port and the oil inlet port pass, and a discharge port from which the sample and the oil have passed through the microchannel are discharged;

a multifunctional lower plate rated from the disposable microchannel upper plate and configured to be permanently used separately from the disposable microchannel upper plate;

a functional polymeric film provided on a lower surface of the disposable microchannel upper plate and configured to remove, in real time, air bubbles in the microchannel while separating the disposable microchannel upper plate and the multifunctional lower plate;

a droplet measuring electrode patterned on an upper surface of the multifunctional lower plate and configured to measure a droplet size depending on a voltage value of the fluid passing through the microchannel;

a negative pressure forming means configured to apply a negative pressure between the disposable microchannel upper plate and the multifunctional lower plate so that the disposable microchannel upper plate and the multifunctional lower plate are coupled or separated by vacuum; and a flow velocity control device configured to adjust the droplet size to a desired size by receiving, by feedback, the voltage value measured by the droplet measuring electrode and controlling flow velocities of the oil and the sample, wherein the disposable microchannel upper plate further comprises a second oil inlet port, and a droplet discharge port and the oil discharge port are separately formed to discharge the fluids having passed through the microchannel while dividing the fluids into the droplet and the oil.

6. The active droplet generating apparatus of claim 5, wherein the microchannel has a '+'-shaped droplet generating structure configured to generate the droplet and provided at a point at which the oil and the sample meet together, and wherein the oil is introduced through the second oil inlet port between the '+'-shaped droplet generating structure and the droplet measuring electrode to increase an interval between the droplets.

* * * * *